United States Patent Office 3,275,670
Patented Sept. 27, 1966

3,275,670
NOVEL UREA DERIVATIVES
Gustav Steinbrunn, Schwegenheim, Pfalz, Adolf Fischer, Mutterstadt, Pfalz, and Erich Flickinger, Frankweiler, Pfalz, Germany, assignors to Badische Anilin- & Soda-Fabrik Aktiengesellschaft, Ludwigshafen am Rhine, Germany
No Drawing. Filed Nov. 30, 1964, Ser. No. 414,882
Claims priority, application Germany, Dec. 3, 1963, B 74,507; July 4, 1964, B 77,541
4 Claims. (Cl. 260—453)

It is known that urea derivatives, for example N-p-chlorophenyl-N'-methyl-N'-isobutinylurea or N-p-chlorophenyl-N',N'-di-methylurea, may be used for controlling weeds. There action is however unsatisfactory.

We have found that selective herbicides which contain a urea derivative having the formula:

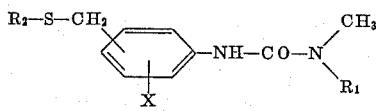

in which $R_1$ denotes methyl, methoxy or sec-but-3-ynyl, $R_2$ denotes an alkyl radical having up to four carbon atoms, an alkyl radical having up to four carbon atoms and bearing a hydroxyl group as a substituent, an alkenyl radical having 3 to 4 carbon atoms and bearing two or three chlorine atoms as substituents, or the trichlorobenzyl radical, X denotes a chlorine atom or a hydrogen atom, have a good effect against broad-leaved weeds and against grasses in beet, wheat and rice. Another advantage of the herbicides is that they can be used for post-emergence treatment. Some of the urea derivatives are syrups, others are solid products. They may be prepared from corresponding substituted N-p- or N-m-chloromethylphenyl- or -chlorophenyl-N'-methyl-N'-alkyl- or -N'-alkoxy- or -N'-alkynylureas. The substituted N-p- or N-m-halomethylphenyl- or -halophenyl-N'-methyl-N'-alkyl- or -N'-alkoxy- or -N'-alkynylureas required as initial materials may be obtained from the corresponding substituted phenylisocyanates or halophenyl-isocyanates or their carbamyl chlorides by reaction with dialkylamines, methyl-alkoxyamines or methylalkynylamines. The N-chloromethylphenyl- or N-chloromethylhalophenyl-N'-dialkyl- or N'-alkyl-N'-alkynylureas thus obtained may be reacted with the corresponding alkyl or halogen substituted or alkenyl substituted alkenylmercaptans or their metal salts in the presence of acid-binding substances in order to obtain the urea derivatives to be contained in the herbicides according to this invention. The substituted N-p-halomethylphenyl-N'-methyl-N'-methoxy-ureas which are also required as initial products are obtainable from the corresponding substituted phenylisocyanates by reaction with O,N-dimethylhydroxyl-amine or by reaction with hydroxylamine and subsequent methylation, for example with dimethyl sulfate, or by reaction of the corresponding substituted phenylcarbamyl chlorides in the presence of alkali with hydroxylamine or O,N-dimethylhydroxylamine.

Suitable p- or m-chloromethylphenyl isocyanates or p- or m-chloromethylhalophenyl isocyanates are 3-chloro-4-chloromethylphenyl isocyanate, 4-chloro-3-chloromethylphenyl isocyanate, 3-chloromethylphenyl isocyanate or their phenylcarbamyl chlorides.

Suitable mercaptans for the reaction are β-hydroxyethylmercaptan, 2,3 - dichloroallylmercaptan, 2,3,3 - trichloroallylmercaptan, 3,3 - dichloromethallylmercaptan, 2,3,6 - trichlorobenzylmercaptan, 3,4-dichlorobuten -(3)-yl -(2)- mercaptan or 2,3,4-trichlorobuten-(2)-yl-(1)-mercaptan. Alkali metal salts may be chosen as the metal salts of the mercaptans.

The reaction may however be carried out in the presence of trialkylamines. The following recipes explain the production of the urea derivatives:

18 parts (by weight) of 2,3,3-trichloroallylmercaptan is added while stirring in a nitrogen atmosphere to 5.6 parts of potassium hydroxide dissolved in 120 parts of ethyl alcohol. Then, at 40° to 50° C, 28 parts of N-3-chloro- 4 -chloromethylphenyl - N'-methyl - N'- isobutynylurea dissolved in 80 parts of acetonitrile is dripped in. Stirring is continued for some time at 60° to 65° C. The ethyl alcohol is then evaporated at subatmospheric pressure, the residue is dissolved in ethyl acetate and water, the layers are separated and the ethyl acetate solution is washed with water. The solution is filtered and dried and the solvent is partly removed in vacuo. The product is then precipitated by adding petroleum ether. 35 parts of N-4-(2',3',3'-trichloroallylthiomethyl)-3-chlorophenyl-N'-methyl-N'-sec-but-3-ynyl is obtained as a syrup (sec-but-3-ynyl being the radical butyne-(1)-yl-(3)) having a chlorine content of 32.5% (calculated value 33.3%). The product has the formula:

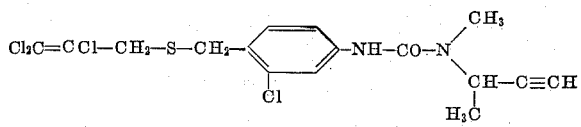

90 parts (by weight) of 2,3,3-trichloroallylmercaptan is added to 28 parts of potassium hydroxide, dissolved in 400 parts of ethyl alcohol, while passing nitrogen through. While stirring at 40° to 50° C., a solution of 130 parts of N - 3 - chloro-4-chloromethylphenyl-N'-methyl-N'-methoxyurea in 500 parts of alcohol is dripped in and the reaction is allowed to continue at 55° to 70° C. The bulk of the solvent is then removed at subatmospheric pressure, ethyl acetate is added and the solution is washed well in a separating funnel. 190 parts of N-4-(2',3',3',-trichloroallylthiomethyl)- 3 -chlorophenyl- N'-methyl- N'-methoxyurea is obtained as a syrup. The chlorine content is 36% (calculated value 35.3%). The product has the following formula:

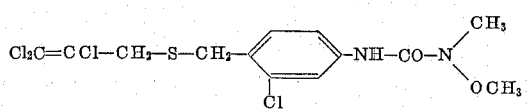

Other urea derivatives are listed in the following tables:

TABLES

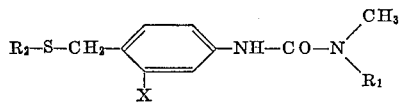

| R₂ | X | R₁ | M. pt. | Analysis: Cl, percent f.= found. c.= calculated. |
|---|---|---|---|---|
| 2',3',3'-trichlorobenzyl | Cl | —C₄H₅ | Syrup | f. 29.3. / c. 29.8. |
| β-Hydroxyethyl | Cl | —CH₃ | do | f. 11.7. / c. 12.3. |
| 3',3'-dichloromethallyl | Cl | —CH₃ | 104° to 105° C | |
| Methyl | Cl | —CH₃ | Syrup | f. 13.2. / c. 13.7. |
| 2',3',3'-trichloroallyl | Cl | —CH₃ | 75° to 76.5° C | |
| 3',3'-dichloromethallyl | Cl | —OCH₃ | | f. 27.1. / c. 27.8. |
| 2',3'-dichloroallyl | Cl | —OCH₃ | | f. 28.0. / c. 28.8. |

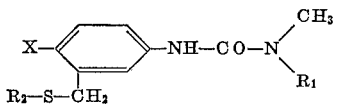

| | | | | |
|---|---|---|---|---|
| 2',3',3'-trichloroallyl | H | —C₄H₅ | Syrup | f. 27.4. / c. 27.2. |
| 2',3',6'-trichlorobenzyl | H | —C₄H₅ | do | f. 25. / c. 24.2. |
| 3',3'-dichloromethallyl | Cl | —C₄H₅ | do | f. 25.7. / c. 29.5. |
| 2',3',6'-trichlorobenzyl | Cl | —C₄H₅ | do | f. 29.5. / c. 29.85. |
| 2',3',3'-trichloroallyl | H | —OCH₃ | | f. 29.3. / c. 28.8. |
| 3',3'-dichloromethallyl | H | —OCH₃ | | f. 19.8. / c. 20.3. |
| Do | H | —OCH₃ | 76° C | |

Herbicides in accordance with this invention are prepared by mixing the active substances with conventional carriers. They may be used either alone or mixed with other active substances. They may also be mixed with fertilizers and used in granulated form as herbicides. Examples of additives for the production of emulsions are salts of alkylbenzenesulfonic acids, salts of ammonium compounds, or oxalkylated phenol derivatives.

The invention is further illustrated by the following examples relating to the use of the herbicides according to this invention.

*Example 1*

Plants of rice (*Oryza sativa*), wheat (*Triticum vulgare*), wild oats (*Avena fatua*), slender foxtail (*Alopecurus myosuroides*), annual meadow grass (*Poa annua*), wild camomile (*Matricaria chamomilla*) and a mixture of weeds consisting of sorrel (*Rumex spp.*), vetch (*Vicia cracca*), nettle (*Urtica urens*), cleavers (*Galium aparine*), white goosefoot (*Chenopodium album*) and chickweed (*Stellaria media*), at a growth height of 3 to 12 cm. in a greenhouse are sprayed with N-4-(2',3',3'-trichloroallyl-thiomethyl)-3-chlorophenyl-N'-methyl-N'-sec - but-3-ynylurea (I) and, for comparison therewith, with N-p-chlorophenyl-N'-methyl-N'-sec-but-3-ynylurea (II) each at a rate equivalent to the use of 1.5 kg. of active substance per hectare, dispersed in 500 liters of water per hectare. After three weeks, it is evident that N-4-(2',3',3'-trichloroallylthiomethyl)-3 - chlorophenyl - N'-methyl-N'-sec-but-3-ynylurea (I) has a more favorable plant compatibilty with rice (*Oryza sativa*) and wheat (*Triticum vulgare*) than N-p-chlorophenyl-N'-methyl-N'-sec-but-3-ynylurea (II).

The experimental results are given in the following table:

TABLE

| | Active substance | |
|---|---|---|
| | I | II |
| Amount of active substance used in kg. per hectare | 1.5 | 1.5 |
| Crop plants: | | |
| Rice | 0 to 10 | 50 to 60. |
| Wheat | 10 | 30. |
| Weeds: | | |
| Wild oats | 50 to 60 | 50. |
| Slender foxtail | 90 | 80 to 90. |
| Wild camomile | 90 to 100 | 90 to 100. |
| Weed mixture | 90 to 100 | 90 to 100. |
| Annual meadow grass | 90 to 100 | 90 to 100. |

0 denotes no damage and 100 denotes total destruction.

A similar effect is achieved with the following urea derivatives as with N-4-(2',3',3'-trichloroallylthiomethyl)-3-chlorophenyl-N'-methyl-N'-sec-but-3-ynylurea:

N-4-(2',3'-dichloroallylthiomethyl)-3-chlorophenyl-N'-methyl-N'-sec-but-3-ynylurea, N-4-(3',3'-dichloromethylallylthiomethyl)-3-chlorophenyl-N'-methyl-N'-sec-but-3-ynylurea, N-3-(2',3',3'-trichloroallylthiomethyl)-4-chlorophenyl-N'-methyl-N'-sec-but-3-ynylurea, N-4-(2',3',6'-trichlorobenzylthiomethyl)-3-chlorophenyl-N'-methyl-N'-sec-but-3-ynylurea, N-3-(2',3',3'-trichloroallylthiomethyl)-phenyl-N'-methyl-N'-sec-but-3-ynylurea, N-4-(ethylthiomethyl)-3-chlorophenyl-N'-methyl-N'-sec-but-3-ynylurea.

Example 2

Plants of rice (*Oryza sativa*), wheat (*Triticum vulgare*), wild oats (*Avena fatua*), annual meadow grass (*Poa annua*), camomile (*Matricaria chamomilla*) and an assortment of weeds consisting of cleavers (*Galium aparine*), vetch (*Vicia cracca*), chickweed (*Stellaria media*), nettle (*Urtica urens*), white goosefoot (*Chenopodium album*) and sorrel (*Rumex spp.*) are planted in plastic pots. After the plants have reached a plant height of 3 to 15 cm. they are sprayed with N-4-(2′,3′,3′-trichloroallylthiomethyl)-3-chlorophenyl-N′ - dimethylurea (I) and, for comparison therewith, with N-p-chlorophenyl-N′-dimethylurea (II), each at a rate equivalent to the use of 1.5 kg. of active substance per hectare, dispersed in 500 liters of water per hectare.

Three weeks later it is evident that N-4-(2′,3′,3′-trichloroallylthiomethyl)-3-chlorophenyl-N′ - dimethylurea (I) has a considerably more favorable plant compatibility with rice (*Oryza sativa*) and wheat (*Triticum vulgare*) than N-p-chlorophenyl-N′-dimethylurea (II).

Arable land treated with N-4-(2′,3′,3′-trichloroallylthiomethyl)-3-chlorophenyl-N′-dimethylurea (I) may be broken up and freshly planted after three to four weeks without the freshly emerging crop plants being damaged by the after-effect of this compound. This is not the case with N-p-chlorophenyl-N′-dimethylurea.

The results of the experiment may be seen from the following table:

TABLE

| | Active substance | |
|---|---|---|
| | I | II |
| Amount of active substance used in kg. per hectare | 1.5 | 1.5 |
| Crop plants: | | |
| Rice | 10 to 20 | 100. |
| Wheat | 10 to 20 | 40. |
| Weeds: | | |
| Wild oats | 90 | 90 to 100. |
| Annual meadow grass | 90 to 100 | 90 to 100. |
| Camomile | 100 | 100. |
| Assorted weeds | 90 to 100 | 90 to 100. |

0 denotes no damage and 100 denotes total destruction.

The following compounds have a similar effect to N-4-(2′,3′,3′-trichloroallylthiomethyl)-3 - chlorophenyl - N′-dimethylurea:

N-4-(2′,3′-dichloroallylthiomethyl)-3-chlorophenyl-N′-dimethylurea,

N-4-(3′,3′-dichloromethylallylthiomethyl)-3-chlorophenyl-N′-dimethylurea,

N-3-(2′,3′,3′-trichloroallylthiomethyl)-phenyl-N′-dimethylurea and

N-4-(2′,3′,6′-trichlorobenzylthiomethyl)-3-chlorophenyl-N′-dimethylurea.

Example 3

Beet (*Beta vulgaris*), cock's foot grass (*Dactylis glomerata*), mustard (*Sinapis alba*), wild oats (*Avena fatua*), slender foxtail (*Alopecurus myosuroides*) and assorted weeds consisting of sorrel (*Rumex acetosa*), ribwort plaintain (*Plantago lanceolata*), vetch (*Vicia cracca*), camomile (*Matricaria chamomilla*), chickweed (*Stellaria media*), small nettle (*Urtica urens*), white goosefoot (*Chenopodium album*) at an average height of 8 to 14 cm. in a greenhouse are sprayed at a rate of 1.5 and 3 kg. per hectare with N-4-(2′,3′,3′-trichloroallylthiomethyl)-3-chlorophenyl-N′-methyl-N′ - methoxyurea dispersed with an addition of sodium lignin sulfonate in 600 liters per hectare of water. Three weeks later it is observed that the assorted weeds, cock's-foot grass and mustard have completely withered. An effect of more than 80% is achieved with slender foxtail and wild oats. The beet is inhibited in growth by only about 10%. Fourteen days later this growth inhibition of the beet has completely grown out again, whereas the weeds and weed grasses have completely withered.

The following substances have a similar effect:

N-4-(3′,3′-dichloromethallylthiomethyl)-3-chlorophenyl-N′-methyl-N′-methoxyurea, N-4-(3′,4′-dichlorobuten-(3)-yl-(2)-thiomethyl)-3-chlorophenyl-N′-methyl-N′-methoxyurea and N-4-(2′,3′,4′-trichlorobuten-(2)-yl-(1)-thiomethyl)-3-chlorophenyl-N′-methyl-N′-methoxyurea.

Example 4

Wheat (*Triticum vulgare*), beet (*Beta vulgaris*), wild oats (*Avena fatua*), slender foxtail (*Alopecurus myosuroides*), cock's-foot grass (*Dactylis glomerata*), mustard (*Sinapis alba*) and assorted weeds consisting of vetch (*Vicia cracca*), chickweed (*Stellaria media*), nettle (*Urtica urens*), white goosefoot (*Chenopodium album*), camomile (*Matricaria chamomilla*) and sorrel (*Rumex acetosa*) at an average height of 5 to 15 cm. in a greenhouse are sprayed at the rate of 1.5 kg. per hectare with N-4-(2′,3′,3′-trichloroallylthiomethyl) - 3 - chlorophenyl-N′-methyl-N′-methoxyurea (I) in comparison with N-p-chlorophenyl-N′-methyl-N′-methoxyurea (II) and N-3,4-dichlorophenyl-N′-methyl-N′-methoxyurea (III) dispersed in 500 liters of water per hectare. The results are shown in the following table:

| | Active substance | | |
|---|---|---|---|
| | I | II | III |
| Crop plants: | | | |
| Wheat | 20 to 30 | 80 | 90. |
| Beet | 0 to 10 | 100 | 100. |
| Weeds: | | | |
| Wild oats | 80 to 90 | 40 to 50 | 90. |
| Slender foxtail | 70 | 40 | 60 to 70. |
| Cock's-foot grass | 100 | 50 to 60 | 90 to 100. |
| Mustard | 100 | 100 | 100. |
| Assorted weeds | 100 | 100 | 100. |

0 denotes no damage and 100 denotes total destruction.

It may be seen from the table that active substance I has a better herbicidal activity in part than active substances II and III. Compatibilty with beet and wheat is clearly best of all the active substances tested with active substance I.

The following compounds have a similar effect:

N-4-(3′,3′-dichloromethallylthiomethyl)-3-chloro-phenyl-N′-methyl-N′-methoxyurea, N-4-(3′,4′-dichlorobuten-(3′)-yl-(2′)-thiomethyl)-3-chlorophenyl-N′-methyl-N′-methoxyurea and N-4-(2′,3′,4′-trichlorobuten-(2)-yl-(1)-thiomethyl)-3-chlorophenyl-N′-methyl-N′-methoxyurea.

Example 5

Wheat (*Triticum vulgare*), barley (*Hordeum vulgare*), maize (*Zea mays*), rice (*Oryza sativa*), carrots (*Daucus carota*), beans (*Phaseolus vulgaris*), slender foxtail (*Alopecurus myosuroides*), annual meadow grass (*Poa annua*), wild mustard (*Sinapis arvensis*), amaranth (*Amaranthus retroflexus*), small nettle (*Urtica urens*) and white goosefoot (*Chenopodium album*) at a growth height of 3 to 15 cm. in a greenhouse are sprayed at the rate of 1.5 kg. per hectare with N-4-(3′,3′-dichloromethallylthiomethyl)-3-chlorophenyl - N′ - methyl - N′-methoxyurea (I) N-4-(2′,3′-dichloromethallylthiomethyl)-3-chlorophenyl-N′-methyl-N′-methoxyurea (II) and, for comparison, N-3′,4′-dichlorophenyl-N′ - methyl - N′-methoxyurea (III) dispersed in 500 liters per hectare of water.

The results are to be seen in the following table:

TABLE

| Plants | Active substance (1.5 kg./ha.) | | |
|---|---|---|---|
| | I | II | III |
| Crop plants: | | | |
| Wheat | 15 | 0 | 80. |
| Barley | 10 to 20 | 10 | 40. |
| Maize | 10 to 20 | 10 | 60. |
| Rice | 0 to 10 | 0 | 30 to 40. |
| Carrots | 0 to 10 | 15 | 10 to 20. |
| Beans | 0 | 30 | 30 to 40. |
| Weeds: | | | |
| Slender foxtail | 60 | 50 | 50. |
| Annual meadow grass | 80 | 60 | 80. |
| Mustard | 100 | 90 to 100 | 100. |
| Amaranth | 80 to 100 | 80 to 100 | 100. |
| Small nettle | 100 | 90 | 100. |
| White goosefoot | 90 to 100 | 90 to 100 | 90 to 100. |

0 denotes no damage and 100 denotes total destruction.

*Example 6*

The weeds white goosefoot (*Chenopodium album*), small nettle (*Urtica urens*), gallant soldier (*Galinsoga parviflora*), wild mustard (*Sinapis arvensis*), camomile (*Matricaria chamomilla*), vetch (*Vicia sepium*), knotweed (*Polygonum sp.*), groundsel (*Senecio vulgaris*), wild thistle (*Cirsium arvense*), chickweed (*Stellaria media*), dead nettle (*Lamium amplexicaule*), annual meadow grass (*Poa annua*), rye grass (*Lolium perenne*), slender foxtail (*Alopecurus myosuroides*) and wild oats (*Avena fatua*) at a growth height of 3 to 8 cm. on an agricultural cultivated area are sprayed at the rate of 3 kg. per hectare of N-4-(2,3-dichloromethallylthiomethyl)-3-chlorophenyl-N' - methyl - N' - methoxyurea in 500 liters per hectare of water. One or two days later, the plants begin to wither from the tips of the leaves and after eight to fourteen days all the weeds and weed grasses have withered.

The following have similar action:

N-4-(2,3,3-trichloroallylthiomethyl)-3-chlorophenyl-N'-methyl-N'-methoxyurea,

N-4(3',3'-dichloromethallylthiomethyl)-3-chlorophenyl-N'-methyl-N'-methoxyurea and N-4-(2',3',4'-trichlorobuten-(2)-yl-(1)-thiomethyl)-3-chlorophenyl-N'-methyl-N'-methoxyurea.

We claim:

1. A compound having the formula:

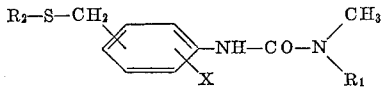

in where $R_1$ denotes a member selected from the group consisting of methyl, methoxy and sec-but-3-ynyl, $R_2$ denotes a member selected from the group consisting of an alkyl radical having up to four carbon atoms, an alkyl radical having up to four carbon atoms which bears a hydroxyl group as a substituent, an alkenyl radical having three to four carbon atoms and bearing two to three chlorine atoms as substituents, and the trichlorobenzyl radical X denotes a member selected from the group consisting of hydrogen and chlorine.

2. N-4-(2',3',3'-trichloroallylthiomethyl) - 3 - chlorophenyl-N'-methyl-N'-sec-but-3-ynylurea.

3. N-4-(2',3',3'-trichloroallylthiomethyl) - 3 - chlorophenyl-N'-methyl-N'-methylurea.

4. N-4-(2',3',3'-trichloroallylthiomethyl) - 3 - chlorophenyl-N'-methyl-N'-methoxyurea.

References Cited by the Examiner

UNITED STATES PATENTS

| 2,744,819 | 5/1956 | Toorman | 71—2.6 |
| 2,863,754 | 12/1958 | Wain | 71—2.6 |
| 2,960,534 | 11/1960 | Scherer et al. | 260—553 |
| 2,999,110 | 9/1961 | Lott et al. | 260—553 |

ALEX MAZEL, *Primary Examiner.*

JAMES O. THOMAS, JR., HENRY R. JILES,
*Examiners.*

JAMES H. TURNIPSEED, *Assistant Examiner.*